United States Patent
Bello et al.

(10) Patent No.: US 12,423,573 B2
(45) Date of Patent: Sep. 23, 2025

(54) NEURAL NETWORK OPTIMIZER SEARCH

(71) Applicant: Google LLC, Mountain View, CA (US)

(72) Inventors: Irwan Bello, San Francisco, CA (US); Barret Zoph, Sunnyvale, CA (US); Vijay Vasudevan, Los Altos Hills, CA (US); Quoc V. Le, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 1082 days.

(21) Appl. No.: 17/145,524

(22) Filed: Jan. 11, 2021

(65) Prior Publication Data

US 2021/0271970 A1 Sep. 2, 2021

Related U.S. Application Data

(63) Continuation of application No. 16/662,924, filed on Oct. 24, 2019, now Pat. No. 10,922,611, which is a (Continued)

(51) Int. Cl.
*G06N 3/08* (2023.01)
*G06N 3/044* (2023.01)
*G06N 3/045* (2023.01)

(52) U.S. Cl.
CPC ............ *G06N 3/08* (2013.01); *G06N 3/044* (2023.01); *G06N 3/045* (2023.01)

(58) Field of Classification Search
CPC .......... G06N 3/044; G06N 3/045; G06N 3/08; G06N 3/084; G06N 3/09; G06N 3/092; G06N 3/0985
See application file for complete search history.

(56) References Cited

U.S. PATENT DOCUMENTS

2016/0098632 A1 4/2016 Sutskever et al.
2016/0140435 A1 5/2016 Bengio et al.
(Continued)

FOREIGN PATENT DOCUMENTS

CN 103324886 9/2013
CN 105940395 9/2016
CN 106462801 2/2017

OTHER PUBLICATIONS

Abadi et al, "Tensorflow: A system for large-scale machine learning," 12th {USENIX} Symposium on Operating Systems Design and Implementation ({OSDI} 16), Nov. 2016, 21 pages.
(Continued)

*Primary Examiner* — Brent Johnston Hoover
(74) *Attorney, Agent, or Firm* — Fish & Richardson P.C.

(57) ABSTRACT

Methods, systems, and apparatus, including computer programs encoded on computer storage media, for determining update rules for training neural networks. One of the methods includes generating, using a controller neural network, a batch of output sequences, each output sequence in the batch defining a respective update rule; for each output sequence in the batch: training a respective instance of a child neural network using the update rule defined by the output sequence; evaluating a performance of the trained instance of the child neural network on the particular neural network task to determine a performance metric for the trained instance of the child neural network on the particular neural network task; and using the performance metrics for the trained instances of the child neural network to adjust the current values of the controller parameters of the controller neural network.

16 Claims, 3 Drawing Sheets

Related U.S. Application Data continuation of application No. PCT/US2018/030281, filed on Apr. 30, 2018.

(60) Provisional application No. 62/492,021, filed on Apr. 28, 2017.

(56) References Cited

U.S. PATENT DOCUMENTS

| | | |
|---|---|---|
| 2016/0217368 A1 | 7/2016 | Ioffe et al. |
| 2016/0358043 A1 | 12/2016 | Mu |
| 2016/0358073 A1 | 12/2016 | Desjardins et al. |
| 2017/0024643 A1 | 1/2017 | Lillicrap et al. |
| 2017/0300813 A1* | 10/2017 | Lee .................. G06N 3/045 |
| 2019/0232488 A1* | 8/2019 | Levine .............. G06N 3/08 |
| 2020/0104678 A1 | 4/2020 | Nixon |

OTHER PUBLICATIONS

Andrychowicz, et al. "Learning to learn by gradient descent by gradient descent" In Advances in Neural Information Processing Systems, 2016, 9 pages.

Ba et al, "Distributed second-order optimization using Kronecker-factored approximations" International Conference on Learning Representations, 2017, 17 pages.

Baker et al, "Designing neural network architectures using reinforcement learning" arXiv, Mar. 2017, 18 pages.

Bengio et al, "Use of genetic programming for the search of a new learning rule for neural networks" IEEE Conference on Evolutionary Computation, 1994, 4 pages.

Dauphin et al, "Identifying and attacking the saddle point problem in high-dimensional non-convex optimization" arXiv, Jun. 2014, 14 pages.

Duchi et al, "Adaptive subgradient methods for online learning and stochastic optimization" Journal of Machine Learning, Jul. 2011, 39 pages.

Hochreiter et al, "Learning to learn using gradient descent" International Conference on Artificial Neural Networks, 2001, 8 pages.

Hochreiter et al, "Long short-term memory" Neural computation, 1997, 32 pages.

Keskar et al, "On large-batch training for deep learning: Generalization gap and sharp minima" arXiv, Feb. 2017, 16 pages.

Kingma et al., "Adam: A method for stochastic optimization" International Conference on Learning Representations, 2015, 15 pages.

Le et al., "On optimization methods for deep learning" In Proceedings of the 28th International Conference on Machine Learning, 2011, 8 pages.

LeCun et al., Efficient backprop. In Neural networks: Tricks of the trade, 1998, 44 pages.

Li et al., "Learning to optimize neural nets," arXiv preprint arXiv:1703.00441, Mar. 2017, 10 pages.

Liu et al., "On the limited memory BFGS method for large scale optimization," Mathematical programming, Aug. 1989, 45(1): 503-528.

Loshchilov et al., "SGDR: stochastic gradient descent with restarts," International Conference on Learning Representations, Aug. 2016.

Martens and Sutskever, "Training deep and recurrent networks with Hessian-free optimization," In Neural networks: Tricks of the trade, 2012, 479-535.

Martens, "Deep learning via Hessian-free optimization," In Proceedings of the 27th International Conference on Machine Learning, Jun. 2010, 27: 735-742.

Orchard and Wang, "The evolution of a generalized neural learning rule," In 2016 International Joint Conference on Neural Networks (IJCNN), Jul. 2016, 4688-4694.

Pascanu and Bengio, "Revisiting natural gradient for deep networks," arXiv preprint arXiv:1301.3584, Jan. 2013, 16 pages.

Pascanu et al., "On the difficulty of training recurrent neural networks," In International Conference on Machine Learning, Feb. 2013, 1310-1318.

PCT International Preliminary Report on Patentability in International Application No. PCT/US2018/030281, dated Oct. 29, 2019, 8 pages.

PCT International Search Report and Written Opinion in International Application No. PCT/US2018/030281, dated Sep. 19, 2018, 14 pages.

Ravi and Larochelle, "Optimization as a model for few-shot learning," In International Conference on Learning Representations, 2017, 18 pages.

Riedmiller and Braun, "RPROP—a fast adaptive learning algorithm," In Proc. of ISCIS VII, Universitat. Citeseer, 1992, 7 pages.

Runarsson and Jonsson, "Evolution and design of distributed learning rules," In IEEE Symposium on Combinations of Evolutionary Computation and Neural Networks, May 2000, 59-63.

Schaul et al., "No more pesky learning rates," In International Conference on Machine Learning, Feb. 2013, 343-351.

Schmidhuber, "Steps towards 'self-referential' neural learning: A thought experiment," Computer Science Technical reports, University of Colorado Boulder, 1992, 18 pages.

Schraudolph, "Fast curvature matrix-vector products for second-order gradient descent," Neural computation, 14(7): 1723-1738.

Schulman et al., "Trust region policy optimization," In ICML, Jun. 2015, 1889-1897.

Shazeer et al., "Outrageously large neural networks: The sparselygated mixture-of-experts layer," International Conference on Learning Representations, 2017, 19 pages.

Williams, "Simple statistical gradient-following algorithms for connectionist reinforcement learning," Machine Learning, May 1992, 8(3-4): 229-256.

Wu et al., "Google's neural machine translation system: Bridging the gap between human and machine translation," arXiv reprint arXiv:1609.08144, Sep. 2016, 23 pages.

Zagoruyko and Komodakis, "Wide residual networks," arXiv preprint arXiv:1605.07146, May 2016, 15 pages.

Zeiler, "Adadelta: an adaptive learning rate method," arXiv preprint arXiv:1212.5701, Dec. 2012.

Zhang et al., "Understanding deep learning requires rethinking generalization," arXiv preprint arXiv:1611.03530, Nov. 2016, 15 pages.

Zoph et al., "Neural Architecture Search with reinforcement learning," International Conference on Learning Representations, Feb. 2017, 16 pages.

Office Action in Chinese Appln. No. 201880034697.0, dated Nov. 30, 2022, 8 pages (with English Translation).

Notice of Allowance in Chinese Appln. No. 201880034697.0, mailed on Sep. 28, 2023, 7 pages (with English translation).

* cited by examiner

NEURAL NETWORK OPTIMIZER SEARCH

CROSS-REFERENCE TO RELATED APPLICATIONS

This application is a continuation of and claims priority to U.S. Ser. No. 16/662,924, filed Oct. 24, 2019, which claims priority to PCT Application No. PCT/US2018/030281, filed on Apr. 30, 2018, which claims priority to U.S. Provisional Application No. 62/492,021, filed on Apr. 28, 2017. The disclosures of the prior applications are considered part of and are incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can determine, using a controller neural network, an update rule for training a neural network to perform a particular neural network task.

Particular embodiments of the subject matter described in this specification can be implemented so as to realize one or more of the following advantages.

During the training of a neural network, the values of the parameters of the neural network are updated at each training iteration using the gradients that were computed at the iteration. Many conventional techniques use a pre-determined update rule to determine how the current gradient is used to update the parameter values. The described systems, on the other hand, determine an update rule that is tailored to the particular task on which the neural network is being trained. In particular, by making use of a recurrent neural network as claimed to predict effective update rules and then evaluating the effectiveness of those rules to update the predictions, the described systems can effectively determine an update rule that is tailored to the particular task. By using the determined update rule during the actual training of the neural network, the training process becomes more efficient because updates are more accurately applied. This can result in (i) the training process using fewer computational resources, e.g., processing power and memory, because the process will require fewer iterations to complete, (ii) the training process yielding a neural network that has improved performance on the particular task because the updates are more effectively applied, or (iii) both.

Thus, the system can effectively and automatically, i.e., without user intervention, select an update rule that will result in a high-performing trained neural network for a particular task.

Because the system determines the update rule by training a controller neural network through reinforcement learning, the system can effectively explore a large space of possible update rules to identify an update rule that is adapted for the particular task.

Additionally, because of the way the update rule is defined by the output of the controller neural network, i.e., because the controller neural network generates a string in a domain specific language that defines the update rule, the system can effectively explore the space of possible update rules in a computationally efficient manner. In particular, because the string defines the update rule in terms of a set of primitive operations, i.e., operands that are outputs of certain primitive operations that have been found to be effective when used as parts of conventional update rules, the system can effectively explore possible combinations of those primitive operations in a relatively small number of iterations.

Moreover, the evaluation of the candidate update rules generated by the system can be parallelized, decreasing the time required to determine an effective update rule for the task.

For example, different image classification tasks require classifying different kinds of images into different kinds of object categories. An update rule that is effective for one image classification task may not be effective for another. For example, one image classification task may be relatively simple and can therefore be effectively learned with large updates, i.e., large step sizes, at each training iteration that are highly-dependent on the current gradient while another may be more complex and can require smaller updates that are dependent on a moving average of recent gradients rather than only on the current gradient. The described systems can determine different update rules for the two different image classification tasks that ensure that neural networks can be efficiently trained on the tasks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
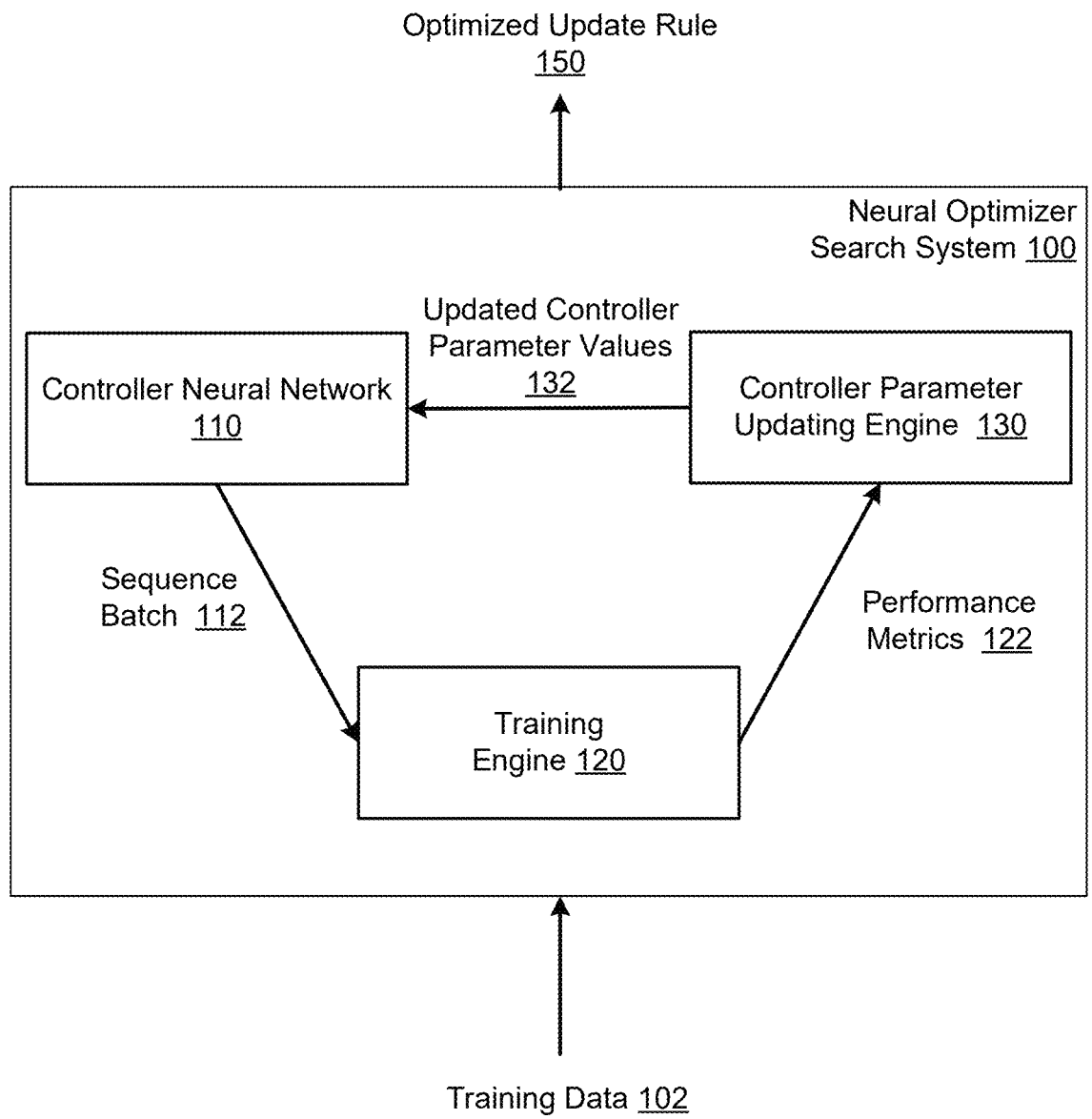
FIG. 1 shows an example neural optimizer search system.

This specification describes a system implemented as computer programs on one or more computers in one or more locations that determines, using a controller neural network, an update rule for updating values of the parameters of a particular neural network during training of the particular neural network to perform a particular neural network task. The update rule is also referred to an optimizer for the training of the first neural network.

In particular, to train a neural network to perform a particular neural network task, a training system uses an iterative training process. At each iteration of the training process, the training system determines a gradient with respect to the values of the parameters of the neural network, determines an update to the current values of the parameters using the gradient using an update rule, and then applies, i.e., adds or subtracts, the update to the current values of the parameters to generate updated parameter values that are then used in the next iteration. The update rule determines how the gradient from the current iteration (and, in some cases, gradients or other quantities determined at previous iterations) is used to generate the update at the current iteration.

This specification describes techniques for determining the update rule in a manner that is tailored for the particular neural network task.

The neural network to be trained can be configured to perform any appropriate neural network task, i.e., to receive any kind of digital data input and to generate any kind of score, classification, or regression output based on the input.

For example, if the inputs to the neural network are images or features that have been extracted from images, the output generated by the neural network for a given image may be scores for each of a set of object categories, with each score representing an estimated likelihood that the image contains an image of an object belonging to the category.

As another example, if the inputs to the neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

FIG. 1 shows an example neural optimizer search system 100. The neural optimizer search system 100 is an example of a system implemented as computer programs on one or more computers in one or more locations, in which the systems, components, and techniques described below can be implemented.

The neural optimizer search system 100 is a system that receives a request to determine an update rule for training a particular neural network to perform a particular task. As part of the request, the neural optimizer search system 100 obtains training data 102 for training the neural network to perform the particular task and a validation set 104 for evaluating the performance of the particular neural network on the particular task.

The neural optimizer search system 100 uses the training data 102 and the validation set 104 to determine an optimized update rule that is tailored for training the neural network to perform the particular task. As described above, the update rule specifies how a gradient computed during an iteration of the neural network training procedure is used to update the current values of the parameters of the neural network, i.e., to update the values of the parameters of the neural network as of that iteration.

Generally, the training data 102 and the validation set 104 both include a set of neural network inputs and, for each network input, a respective target output that should be generated by the particular neural network to perform the particular task. For example, a larger set of training data may have been randomly partitioned to generate the training data 102 and the validation set 104.

The system 100 can receive the training data 102 and the validation set 104 in any of a variety of ways. For example, the system 100 can receive training data as an upload from a remote user of the system over a data communication network, e.g., using an application programming interface (API) made available by the system 100, and randomly divide the uploaded data into the training data 102 and the validation set 104. As another example, the system 100 can receive an input from a user specifying which data that is already maintained by the system 100 should be used for training the neural network, and then divide the specified data into the training data 102 and the validation set 104.

The neural optimizer search system 100 includes a controller neural network 110, a training engine 120, and a controller parameter updating engine 130.

The controller neural network 110 is a neural network that has parameters, referred to in this specification as "controller parameters," and that is configured to generate output sequences in accordance with the controller parameters. Each output sequence generated by the controller neural network 110 defines a candidate update rule for the training of a neural network.

In particular, each output sequence expresses a formula for the candidate update rule as a string in a domain specific language. That is, the output sequence is an ordered collection of characters from a vocabulary of characters for the domain specific language that collectively define a candidate update rule. In some implementations, the string described, in the domain specific language, multiple operands and one or more functions to be applied to the operands. The domain specific language and how the output of the neural network defines the candidate update rule is described in more detail below with reference to FIG. 2.

Generally, the system 100 determines the optimized update rule by training the controller neural network 110 to adjust the values of the controller parameters.

In particular, during an iteration of the controller training procedure, the system 100 generates a batch of sequences 112 using the controller neural network 110 in accordance with current values of the controller parameters.

For each output sequence in the batch 112, the training engine 120 trains an instance of a child neural network in accordance with the candidate update rule defined by the output sequence on the training data 102 and evaluates the performance of the trained instance on the validation set 104.

That is, for a given output sequence, the training engine 120 trains an instance of the child neural network on the training data 102 and, during the training, applies updates to the values of the parameters of the child neural network using the candidate update rule defined by the given output sequence.

The child neural network is a neural network that is configured to perform the particular neural network task. In some implementations, the child neural network is the particular neural network, i.e., has the same architecture as the particular neural network. In other implementations, however, the child neural network is a neural network that has fewer parameters than the particular neural network. That is, the system 100 can determine the optimized update rule using a relatively computationally simple child neural network, i.e., one that has fewer layers than the particular neural network. This ensures that the process of determining the optimized update does not use an excessive amount of computational resources even if a large number of candidate update rules are evaluated before the optimized update rule is determined.

The training engine 120 trains each instance for a fixed number of training epochs prior to evaluating the performance of the instance. In particular, the training engine 120 trains each instance for a small number of epochs relative to the number of epochs that would generally be required to train the particular neural network to completion on the particular task. For example, the training engine 120 can train each instance for five or ten epochs. Such a number of epochs may be suitable for determining the effectiveness of a candidate update rule while keeping the training relatively computationally efficient. This can also ensure that the process of determining the optimized update does not use an excessive amount of computational resources even if a large number of candidate update rules are evaluated before the optimized update rule is determined.

The controller parameter updating engine 130 then uses the results of the evaluations for the output sequences in the batch 112 to update the current values of the controller parameters to improve the expected performance of the trained child neural networks when trained in accordance with update rules defined by the output sequences generated by the controller neural network 110 on the particular task. Evaluating the performance of trained instances and updating the current values of the controller parameters is described in more detail below with reference to FIG. 3.

By repeatedly updating the values of the controller parameters in this manner, the system 100 can train the controller neural network 110 to generate output sequences that define update rules that, when used during training, result in child neural networks that have increased performance on the particular task, i.e., to maximize the expected accuracy on the validation set 104 of the trained child networks.

Once the controller neural network 110 has been trained, the system 100 can select the update rule that performed the best on the validation set 104 as the optimized update rule or can generate a new output sequence in accordance with the trained values of the controller parameters and use the update rule defined by the new output sequence as the optimized update rule.

The neural network search system 100 can then output update rule data 150 that specifies the optimized update rule. For example, the neural network search system 100 can output the update rule data 150 to the user that submitted the training data.

In some implementations, instead of or in addition to outputting the update rule data 150, the system 100 trains the particular neural network using the optimized update rule, e.g., either from scratch or, if the particular neural network to be trained has the same architecture as the child neural network, to fine-tune the parameter values generated as a result of training the instance of the child neural network using the optimized update rule, and then uses the trained neural network to process requests received by users, e.g., through the API provided by the system. That is, the system 100 can receive inputs to be processed, use the trained neural network to process the inputs, and provide the outputs generated by the trained neural network or data derived from the generated outputs in response to the received inputs.

In some implementations, the system 100 trains the controller neural network in a distributed manner. That is, the system 100 evaluates multiple candidate update rules in parallel distributed across multiple different worker computing units that are configured so that they can operate independently of each other. In some implementations, only partial independence of operation is achieved, for example, because computing units share some resources. A computing unit may be, e.g., a computer, a core within a computer having multiple cores, or other hardware or software within a computer capable of independently performing the computation required to evaluate the measure of performance.

In some of these implementations where the training is distributed, each worker computing unit maintains a replica of the controller neural network and has a dedicated training engine that generates performance metrics for batches of output sequences output by the replica and a dedicated controller parameter update engine that determines updates to the controller parameters using the performance metrics.

Once the controller parameter update engine has determined an update, the controller parameter update engine can transmit the update to a central parameter updating server that is accessible to all of the controller parameter updates engines. The central parameter updating server can update the values of the controller parameters that are maintained by the server and send the updated values to the controller parameter update engine. In some cases, each of the multiple replicas and their corresponding training engines and parameter updating engines can operate asynchronously from each other set of training engines and parameter updating engines.

In others of these implementations, the system 100 includes a single controller neural network and each worker computing unit only evaluates output sequences. In particular, the system 100 maintains a queue of output sequence. When an output sequence is generated by the controller neural network, the system 100 adds the output sequence to the queue. When a worker computing unit becomes available, i.e., finishes evaluating an existing output sequence, the system 100 evaluates the candidate sequence that is first in the queue using the worker computing unit that has become available. After the worker computing unit has finished evaluating the candidate sequence, the system 100 designates the worker computing unit as again being available.

Figure 2:
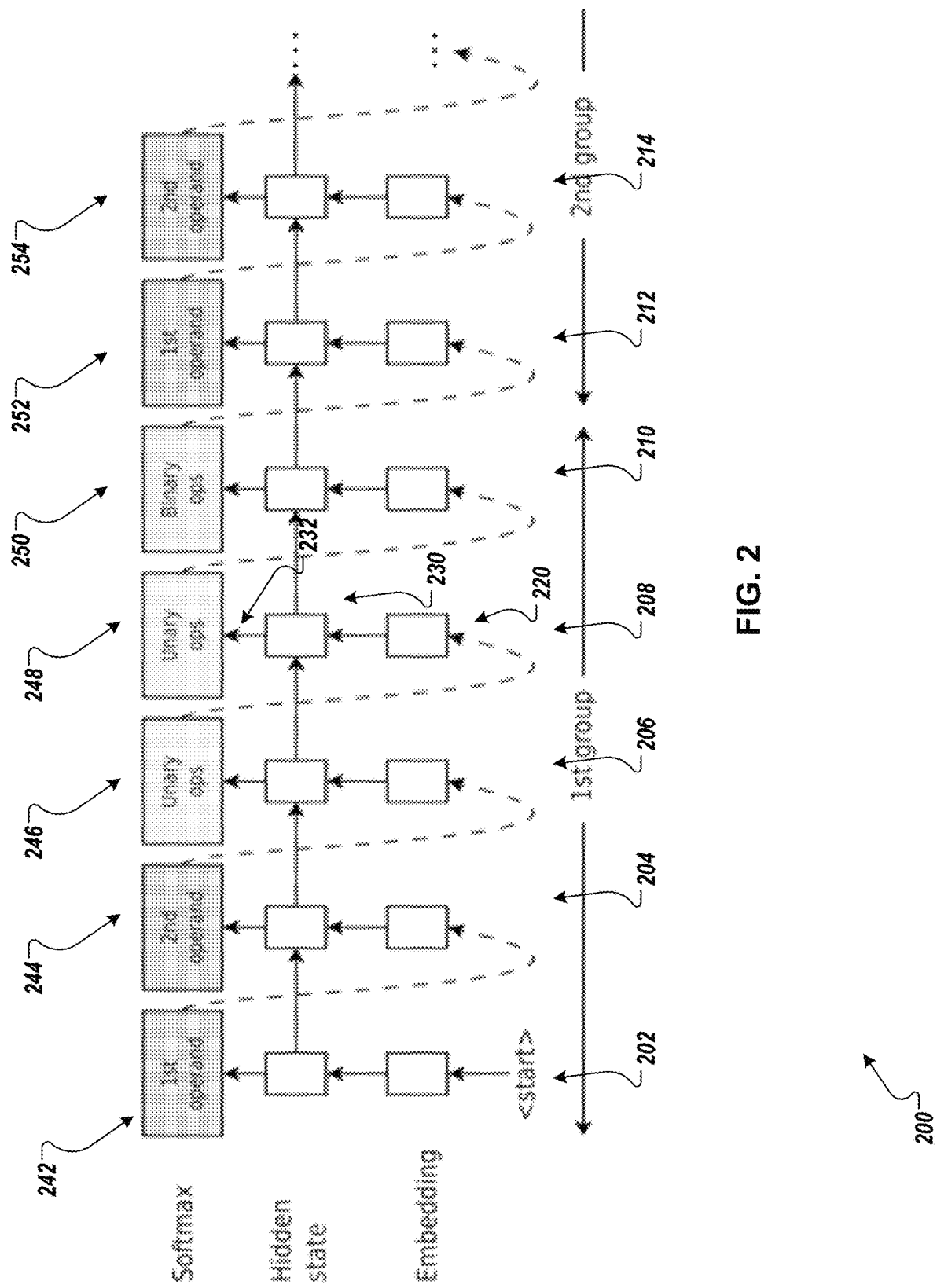
FIG. 2 is a diagram of an example of the controller neural network generating an output sequence.

FIG. 2 is a diagram 200 of an example of the controller neural network 110 generating an output sequence.

Generally, each output sequence is a string of characters in the domain specific language. That is, the output sequence includes a respective character at each of multiple time steps. The character at a given time step is selected from a set of possible characters from the time step according to a syntax defined by the domain specific language. That is, each time step corresponds to a portion of a formula for the update rule and the syntax defines, for each time step, which characters are possible for the time step so that the string defines a valid formula for the update rule.

In the example of FIG. 2, the syntax for the formula is such that the formula for the update $\Delta w$ to be applied to, i.e., added to or subtracted from, the current values of the parameters at a given training iteration can be expressed as:

$$\Delta w = \lambda * b(u_1(op_1), u_2(op_2)),$$

where $\lambda$ is the learning rate (the value of which is not determined by the system but can be selected during the training using conventional techniques), b is a binary function selected from a set of possible binary functions, $u_1$ is a unary function selected from a set of possible unary functions, $u_2$ is another unary function selected from the set of possible unary functions, and $op_1$ and $op_2$ are operands for the first and second unary functions respectively selected from a set of possible operands. The binary function, the unary functions, and the operands are each defined by characters at respective positions in the output sequence.

Thus, the update rule is expressed with a string that includes, at time step 1) the first operand to select, at time step 2) the second operand to select, at time step 3) the unary function to apply on the first operand, at time step 4) the unary function to apply on the second operand and then at time step 5) the binary function to apply to combine the outputs of the unary functions.

In some cases, the string includes a single iteration of these 5 time steps and after the string defines the binary function to apply, the syntax indicates that the output of the binary function is multiplied by the learning rate to generate the update to the current values of the parameters.

In other cases, the string includes multiple iterations of these 5 time steps, and the syntax defines that the output of the binary function for one iteration is added to the set of possible operands for future iterations and can be used as one of the operands in any of the future iterations. In these cases, the output of the binary function for the final iteration is multiplied by the learning rate to generate the update to the current values of the parameters.

The operands, unary functions, and binary functions can include some or all of those specified in Table 1 below (where g is the gradient in the current training iteration):

TABLE 1

Operands: g, $g^2$, $g^3$, $\hat{m}$, $\hat{v}$, $\hat{\gamma}$, sign(g), sign($\hat{m}$), 1, 2, $\epsilon \sim N(0, 0.01)$, $10^{-4}\omega$, $10^{-3}\omega$, $10^{-2}\omega$, $10^{-1}\omega$, Adam, and RMSprop.
Unary functions which map input x to: x, −x, $e^x$, log|x|, $\sqrt{|x|}$, clip(x, $10^{-5}$), clip(x, $10^{-4}$), clip(x, $10^{-3}$), drop(x, 0.1), drop(x, 0.3), drop(x, 0.5) and sign(x).

TABLE 1-continued

Binary functions which map (x, y) to x + y (addition), x − y(subtraction), x∗y(multiplication), $\frac{x}{y+\delta}$ (division), $x^y$ (exponentiation) or x (keep left).
Here, $\hat{m}$, $\hat{v}$, $\hat{\gamma}$ are running exponential moving averages of g, $g^2$ and $g^3$, obtained with decay rates $\beta_1$, $\beta_2$, and $\beta_3$ respectively, drop(.|p) sets its inputs to 0 with probability p and clip(.|l) clips its input to [−1, 1]. All operations are applied element-wise.

Adam and RMSProp are the update rules used by the Adam and RMSProp optimizers, respectively.

As can be seen from Table 1, the operands include the outputs of certain primitive operations that have been found to be useful in determining updates to parameters, e.g., running exponential moving averages, and the Adam and RMSProp update rules. By leveraging these primitive operations as part of the domain specific language, the number of iterations required to train the controller neural network to generate effective update rules is reduced.

In some cases, the operands also include some or all of the decay operands in Table 2, below. Decay operands are operands that vary based on the training iteration, i.e., that depend on how many iterations have already been completed before the current iteration.

TABLE 2 linear decay: $ld = 1 - \frac{t}{T}$.

cyclical decay: $cd_n = 0.5 * \left(1 + \cos\left(2\pi n \frac{t}{T}\right)\right)$ restart decay: $rd_n = 0.5 * \left(1 + \cos\left(\pi \frac{(tn)\%T}{T}\right)\right)$ duced in Loshchilov & Hutter (2017).
annealed noise: $\epsilon_t \sim N(0, 1/(1+t)^{0.55})$
where t is the current training step, T is the total number of training steps and n is a hyperparameter controlling the number of periods in the periodic decays. Note that $cd_{1/2}$ corresponds to cosine decay without restarts (Loshchilov & Hutter, 2017), which we abbreviate as cd.

When the string includes multiple iterations of the time steps 1-5 above, the operands for iterations after the first iteration also include the outputs of the binary functions computed at previous iterations.

The diagram 200 depicts the processing performed by the controller neural network 110 for seven example time steps 202-214 during the generation of an output sequence. As described above, each of the seven time steps 202-214 corresponds to a different portion of the formula for an update rule. That is, the value at each time step is a character in the domain specific language used by the system to represent the formula for the update rule.

The controller neural network 110 is a recurrent neural network that includes an embedding layer, i.e., the layer 220, and one or more recurrent neural network layers, e.g., layer 230.

The embedding layer is configured to receive as input data identifying the character selected at the preceding time step in the given output sequence and to process the input to generate an embedding of the character in an embedding space. The embedding is an ordered collection of numerical values, e.g., a vector of floating point or quantized floating point values. For example, the data identifying the character can be a one-hot encoding of the character and the embedding can be a dense vector in a continuous embedding space.

The one or more recurrent neural network layers receive the embedding as input and process the input to update a current hidden state of the recurrent neural network. For example, the recurrent layers in the controller neural network 110 can be long-short term memory (LSTM) layers or gated recurrent unit (GRU) layers.

In the example of FIG. 2, at time step 208, the layers 220 and 230 receive as input the character from the preceding time step 206 and update the hidden state of the layer 230 from time step 206 to generate as output an updated hidden state 232.

The controller neural network 110 also includes a respective output layer for each time step in the output sequence, e.g., output layers 242-254 for time steps 202-214, respectively. Each of the output layers is configured to receive an output layer input that includes the updated hidden state at the time step and to generate an output for the time step that defines a score distribution over possible characters at the time step. For example, each output layer can first project the output layer input into the appropriate dimensionality for the number of possible values for the time step and then apply a softmax to the projected output layer input to generate a respective score for each of multiple possible values for the character at the time step.

In the example of FIG. 2, the output layer 242 is configured to generate a respective score for each operand in the set of possible operands at the time step 202, the output layer 244 is configured to generate a respective for each operand in the set of possible operands at the time step 204, the output layer 246 is configured to generate a respective score for each unary function in the set of possible unary functions at time step 206, the output layer 248 is configured to generate a respective score for each unary function in the set of possible unary functions at time step 208, and the output layer 250 is configured to generate a respective score for each binary function in the set of possible binary functions at time step 210. Thus, this group of five time steps correspond to a single iteration of time steps 1-5 described above. The next iteration begins at time step 212, and the output layer 252 is configured to generate a respective score for each operand in the set of possible operand for time step 212, which will generally include the output of the binary function selected at time step 210.

Thus, to generate a value for a given time step in an output sequence, the system 100 provides as input to the controller neural network the value of the character at the preceding time step in the output sequence and the controller neural network generates an output for the time step that defines a score distribution over possible characters at the time step. For the very first time step in the output sequence, because there is no preceding time step, the system 100 can instead provide a pre-determined placeholder input. The system 100 then samples from the possible values in accordance with the score distribution to determine the value of the character at the time step in the output sequence.

Generally, the number of characters to be included in each output sequence is fixed prior to generating the sequence, i.e., the number of iterations of time steps 1-5 to be included in the string is fixed prior to generating the sequence. In some implementations, each output sequence generated during the training has the same amount of characters.

In other implementations, the system uses a schedule of increasing the number of iterations in the output sequence as training progresses.

Figure 3:
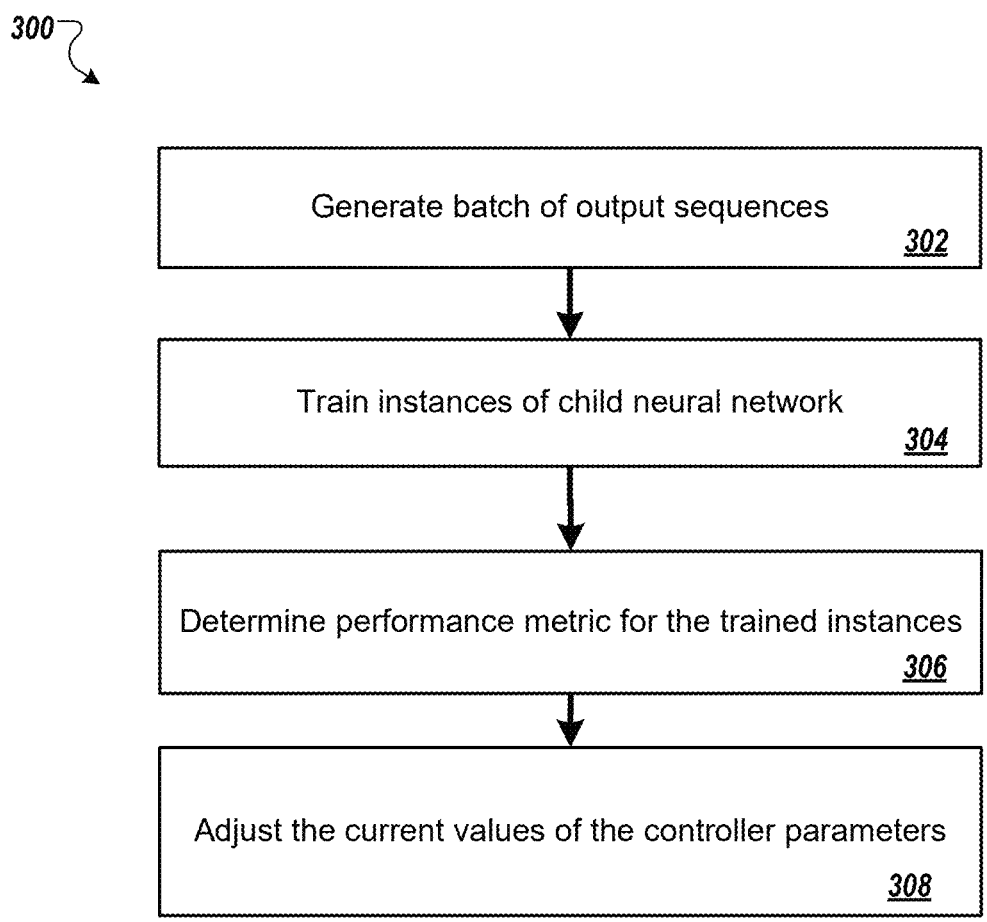
FIG. 3 is a flow diagram of an example process for updating current values of the controller parameters.

FIG. 3 is a flow diagram of an example process 300 for updating current values of the controller parameters. For convenience, the process 300 will be described as being performed by a system of one or more computers located in one or more locations. For example, a neural optimizer search system, e.g., the neural optimizer search system 100 of FIG. 1, appropriately programmed, can perform the process 300.

The system can repeatedly perform the process 300 to train the controller neural network, i.e., to determine trained values of the controller parameters from initial values of the controller parameters.

The system generates a batch of output sequences using the controller neural network and in accordance with current values of the controller parameters as of the iteration (step 302). Each output sequence in the batch defines a respective candidate update rule. In particular, because, as described above, the system samples from a score distribution when generating each value in an output sequence, the sequences in the batch will generally be different even though they are each generated in accordance with the same controller parameter values. The batch generally includes a pre-determined number of output sequences, e.g., four, five, ten, thirty, or sixty sequences.

For each output sequence in the batch, the system trains an instance of the child neural network using the update rule defined by the output sequence to perform the particular neural network task (step 304). That is, for each output sequence in the batch, the system trains an instance on the received training data to perform the particular neural network task using a conventional machine learning training technique that is appropriate for the task, e.g., stochastic gradient descent with backpropagation or backpropagation-through-time. During the training, the system updates the parameter values of the instance using the update rule defined by the output sequence. As described above, in some implementations, the system parallelizes the training of the child neural networks to decrease the overall training time for the controller neural network.

For each output sequence in the batch, the system evaluates the performance of the corresponding trained instance of the child neural network on the particular neural network task to determine a performance metric for the trained instance on the particular neural network task (step 306). For example, the performance metric can be an accuracy of the trained instance on the validation set as measured by an appropriate accuracy measure. For example, the accuracy can be a perplexity measure when the outputs are sequences or a classification error rate when the task is a classification task. As another example, the performance metric can be an average or a maximum of the accuracies of the instance for each of the last two, five, or ten epochs of the training of the instance.

The system uses the performance metrics for the trained instances to adjust the current values of the controller parameters (step 308).

In particular, the system adjusts the current values by training the controller neural network to generate output sequences that result in child neural networks having increased performance metrics using a reinforcement learning technique. More specifically, the system trains the controller neural network to generate output sequences that maximize a received reward that is determined based on the performance metrics of the trained instances. In particular, the reward for a given output sequence is a function of the performance metric for the trained instance. For example, the reward can be one of: the performance metric, the square of the performance metric, the cube of the performance metric, the square root of the performance metric, and so on.

In some cases, the system trains the controller neural network to maximize the expected reward using a policy gradient technique. For example, the policy gradient technique can be a REINFORCE technique or a Proximal Policy Optimization (PPO) technique. Examples of using the REINFORCE technique are described in Williams, Ronald J., "Simple statistical gradient-following algorithms for connectionist reinforcement learning", in Machine Learning, 1992 and in Zoph, Barret and Le, Quoc V. "Neural Architecture Search with reinforcement learning", in International Conference on Learning Representations, 2017. For either technique, the system can use the exponential moving average of previous rewards as a baseline in order to stabilize the training.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for training a particular neural network to perform a particular neural network task, the method comprising repeatedly performing:
   determining a gradient with respect to parameters of the particular neural network;
   applying, to at least the gradient with respect to the parameters of the particular neural network, an update rule to generate an update to values of the parameters of the particular neural network; and
   applying the update to the values of the parameters of the particular neural network,
   wherein the update rule has been generated by performing the following operations:
      determining the update rule using a controller neural network that is different from the particular neural network, comprising:
         generating, using the controller neural network having a plurality of controller parameters and in accordance with current values of the plurality of controller parameters, a plurality of output sequences, each generated output sequence defining a respective candidate update rule and including a respective character selected at each of a plurality of time steps, wherein the respective character at each time step is selected from a set of possible characters for the time step, and
         wherein the controller neural network is configured to, for a given output sequence and at each time step, receive as input the character at a preceding step and process the character through an embedding neural network layer, one or more intermediate neural network layers, and one or more output layers to generate an output for the time step that defines a score distribution over possible characters for the time step, for each generated output sequence:
    training a respective instance of a child neural network to perform a neural network task by repeatedly performing the following:
        determining, through backpropagation, a gradient with respect to parameters of the instance of the child neural network,
        applying, to at least the gradient with respect to the parameters of the instance of the child neural network, the candidate update rule defined by the output sequence generated by the controller neural network to generate an update to values of the parameters of the instance of the child neural network, and
        applying the update to the values of the parameters of the instance of the child neural network, and
    evaluating a performance of the trained instance of the child neural network on the particular neural network task to determine a performance metric for the trained instance of the child neural network on the particular neural network task;
using the performance metrics for the trained instances of the child neural network to adjust the current values of the plurality of controller parameters of the controller neural network; and
generating, using the controller neural network in accordance with the adjusted values of the plurality of controller parameters, a final output sequence that defines the update rule for updating the values of parameters of the particular neural network.

2. The method of claim 1, wherein the child neural network has the same architecture as the particular neural network.

3. The method of claim 1, wherein the child neural network is a neural network that is configured to perform the particular neural network task but has fewer parameters than the particular neural network.

4. The method of claim 1, wherein using the performance metrics for the trained instances of the child neural network to adjust the current values of the plurality of controller parameters of the controller neural network comprises:
    training the controller neural network to generate output sequences that result in child neural networks having increased performance metrics using a reinforcement learning technique.

5. The method of claim 4, wherein the reinforcement learning technique is a policy gradient technique.

6. The method of claim 5, wherein the reinforcement learning technique is a REINFORCE technique.

7. The method of claim 5, wherein the reinforcement learning technique is a Proximal Policy Optimization (PPO) technique.

8. The method of claim 7, wherein the Proximal Policy Optimization (PPO) technique uses an exponential moving average of previous rewards as a baseline function.

9. The method of claim 1, wherein each output sequence expresses a formula for the candidate update rule as a string in a domain specific language.

10. The method of claim 9, wherein the string describes, in the domain specific language, a plurality of operands and one or more functions to be applied to the plurality of operands.

11. The method of claim 10, wherein the plurality of operands are selected from a set of input primitives, and wherein the set of input primitives includes one or more primitives that depend on gradients with respect to the plurality of controller parameters determined during training.

12. The method of claim 10, wherein at least one of the one or more functions takes an output of another function of the one or more functions as input.

13. The method of claim 9, wherein the string includes a respective character at each of a plurality of time steps, and wherein the character at each time step is selected from a set of possible characters for the time step according to a syntax defined by the domain specific language.

14. The method of claim 13, wherein the controller neural network is a recurrent neural network that comprises:
    one or more recurrent neural network layers that are configured to, for a given output sequence and at each time step:
        receive as input the character at the preceding time step in the given output sequence, and to process the input to update a current hidden state of the recurrent neural network; and
    a respective output layer for each time step, wherein each output layer is configured to, for the given output sequence:
        receive an output layer input comprising the updated hidden state at the time step and generate an output for the time step that defines a score distribution over possible characters for the time step.

15. The method of claim 1, wherein the update rule has the following form:

$$\Delta w = \lambda * b(u_1(op_1), u_2(op_2)),$$

wherein $\lambda$ is a learning rate, b is a binary function selected from a set of possible binary functions, $u_1$ is a unary function selected from a set of possible unary functions, $u_2$ is another unary function selected from the set of possible unary functions, and $op_1$ and $op_2$ are operands for the first and second unary functions respectively selected from a set of possible operands,
wherein the set of possible operands comprises g, $g^2$, $g^3$, $\hat{m}$, , $\hat{v}$, $\hat{\gamma}$, sign(g), sign(m), 1, $2_\epsilon \sim N(0, 0.01)$, $10^{-4}w$, $10^{-3}w$, $10^{-2}w$, $10^{-1}w$, ADAM and RMSProp, wherein g represents the gradient, w represents current values of the parameters of the child neural network, wherein ADAM and RMSProp are neural optimizers,
wherein the set of possible unary functions comprises functions which map an input x to:
x, −x, $e^x$, log|x|, $\sqrt{|x|}$, clip(x, $10^{-5}$), clip(x, $10^{-4}$), clip(x, $10^{-3}$), drop(x, 0.1), drop(x, 0.3), drop(x, 0.5), and sign(x),
wherein the set of possible binary functions comprises binary functions which map (x,y) to $$x+y, x-y, x*y, \frac{x}{y+\delta},$$

$x^y$, or x, and
wherein $\hat{m}$, , $\hat{v}$, $\hat{\gamma}$ are running exponential moving averages of g, $g^2$, $g^3$, drop (.|p) sets its input to 0 with probability p and clip(.|l) clips its input to [−l, l], wherein $\delta$ and l are constant values.

16. The method of claim 15, wherein the update rule comprises:
$e^{sign(g)*sign(m)}$+clip(g, $10^{-4}$)]*g,
clip($\hat{m}$, $10^{-4}$)*$e^{\hat{v}}$,
g*$e^{*esign(g)*sign(m)}$,
drop(g, 0.3)*$e^{sign(g)*sign(m)}$, $\text{drop}(\hat{m}, 0.1)/(e^{g^2}+\in),$
$\text{drop}(g, 0.1)*e^{sign(g)*sign(m)},$
$\text{clip}(\text{RMSProp}, 10^{-5})+\text{drop}(\hat{m}, 0.3),$
$\text{ADAM}*e^{sign(g)*sign(m)},$
$\text{ADAM}*e^{\hat{m}},$
$g+\text{drop}(\hat{m}, 0.3),$
$\text{drop}(\hat{m}, 0.1)*e^{g},$
$g-\text{clip}(g^2, 10^{-4}),$
$e^g - e^{\hat{m}},$ or
$\text{drop}(\hat{m}, 0.3)*e^{w}.$

* * * * *